Jan. 14, 1964   E. D. FARLEY   3,117,371
CHAFING GEAR
Filed June 12, 1961
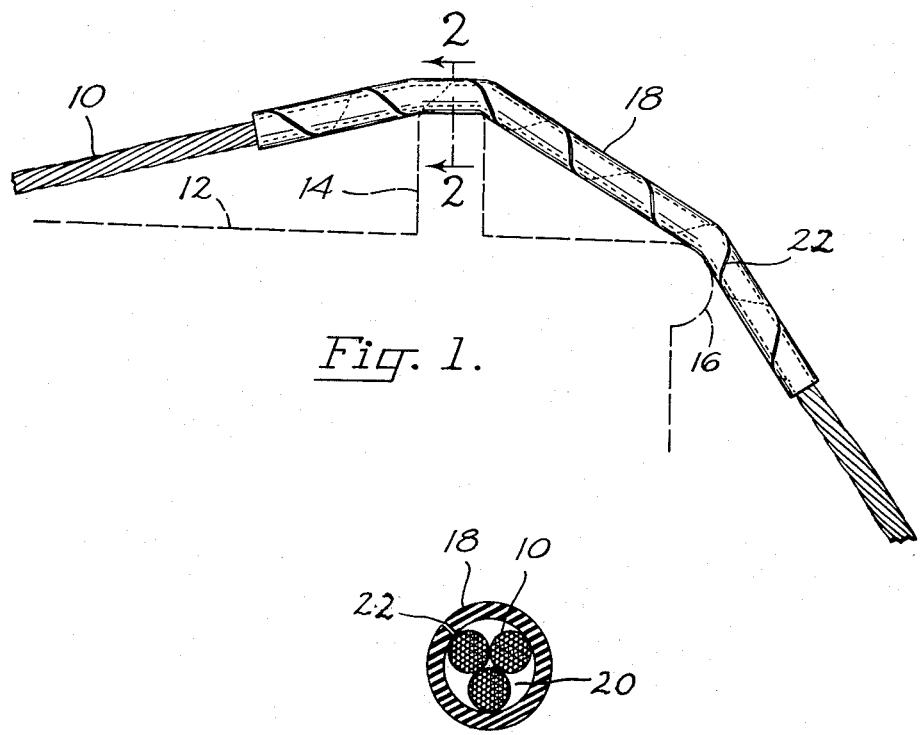
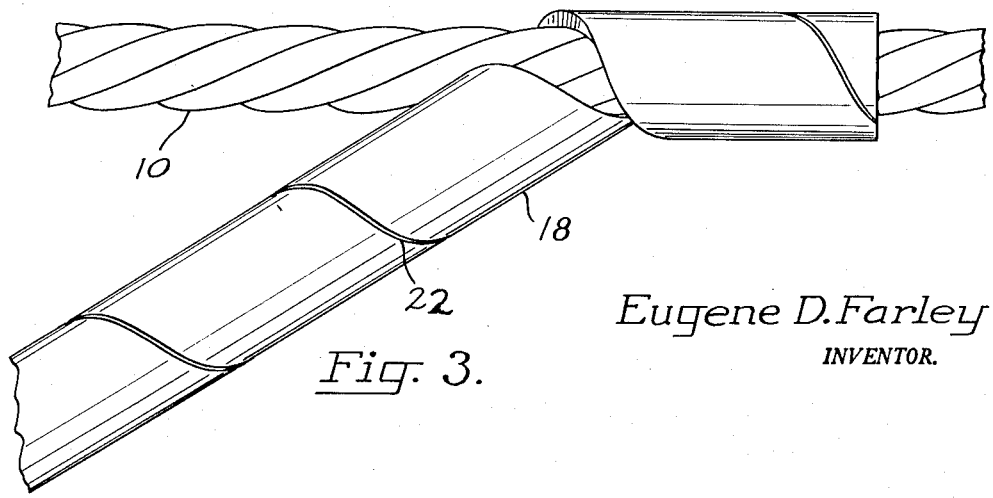
Eugene D. Farley
INVENTOR.

3,117,371
CHAFING GEAR
Eugene D. Farley, 7235 SW. Newton Place,
Portland, Oreg.
Filed June 12, 1961, Ser. No. 116,625
1 Claim. (Cl. 29—450)

This invention relates to chafing gear used for protecting from wear the lines used in mooring, anchoring and towing boats, and in similar applications.

The use of mooring, anchoring and towing lines commonly is attended by chafing of the line wherever it rubs against the dock or against the side of the boat. This is true even though the line is run through a chock. It is particularly true in the case of the newly developed synthetic lines which, while immensely strong, nevertheless are severely subject to chafing wear.

Various expedients commonly are employed to overcome the problem. These include wrapping the line with pieces of cloth, canvas or sheet rubber. None of these expedients is entirely satisfactory since the pieces are difficult to locate properly, since they are worked loose by the motion of the boat, exposing the line to chafing, and since they usually are untidy in appearance.

It is the general object of the present invention to provide chafing gear which overcomes the foregoing disadvantages.

In the drawings:
FIG. 1 is a view in side elevation of the presently described chafing gear, shown in its application to the protection of a line run over the side of a boat;
FIG. 2 is a transverse sectional view, taken along line 2—2 of FIG. 1; and
FIG. 3 is a view in side elevation illustrating the manner of putting the gear on the line.

FIG. 1 illustrates a typical application of the herein described chafing gear. A line 10 is run across a deck 12 and along the side of the boat to an anchor or dock cleat. In this use it normally would rub against coaming strip 14 and rub rail 16. Accordingly, excessive wear of the line by chafing would occur at these two points.

To prevent this wear the presently described chafing gear is employed. It comprises a sheath 18 of natural or synthetic rubber or synthetic plastic which is flexible, wear-and-water resistant, and substantially non-abrasive. The sheath preferably is circular in cross section. It has a longitudinal central opening 20, the diameter of which closely approximates the diameter of the line on which it is to be used, and a spiral slit 22.

Preferably the diameter of the sheath is slightly less than the diameter of the line so that a sliding, frictional contact is present between sheath and line. This makes possible shifting the position of the sheath without removing it from the line, but insures that, when once located, the sheath will remain in place even during prolonged use under adverse conditions.

It is a particular feature of the invention that the presently described gear can be put on and taken off the line with utmost facility. As is apparent from FIG. 3, this is accomplished by spreading sheath 18 so that the line may be inserted in slit 22. The sheath then may be spiralled until it completely encases the line.

Its position may be adjusted merely by sliding it along the line.

It then remains securely in position even though it is bent around corners under conditions of strenuous use. In fact, when thus bent, the tension in the line created by pulling against the anchor or dock cleat serves to hold the sheath in its operative position, as seen in FIG. 1. In the event the line goes slack intermittently, as often occurs in the case of an anchored or moored boat, the frictional engagement of the sheath with the line prevents it from slipping out of place until the tension has been reestablished.

Furthermore, a running adjustment of the position of the sheath on the line may be achieved by releasing the tension of the line and shifting the sheath to the desired location. When desired, it may easily be demounted entirely from the line by reversing the spiraling procedure.

Having thus described the invention in a preferred embodiment, I claim:

The method of preventing the chafing of a line used across an angular surface against which the line tends to rub, the method comprising:
 (a) Providing a short, substantially continuous sheath of non-abrasive, flexible, wear-and-water resistant material having a longitudinal, central opening dimensioned for a sliding frictional fit over the line, the sheath being formed with a continuous spiral slit along its entire length and being spreadable to enable spiralling the sheath onto and off the line.
 (b) Mounting the sheath on the line in sliding frictional contact therewith, covering substantially completely that portion of the line which it overlies.
 (c) Sliding the mounted sheath along the line until it is opposite the angular surface.
 (d) Bending the line and sheath against the surface.
 (e) And tensioning the line, thereby engaging the sheath against the surface and preventing its inadvertent displacement.

References Cited in the file of this patent
UNITED STATES PATENTS

| | | |
|---|---|---|
| 1,977,775 | Patterson | Oct. 23, 1934 |
| 2,032,753 | James | Mar. 3, 1936 |
| 2,160,240 | Wallace et al. | May 30, 1939 |
| 2,258,508 | Kerchner | Oct. 7, 1941 |
| 2,275,019 | Peterson | Mar. 3, 1942 |
| 2,494,285 | Clapp | Jan. 10, 1950 |
| 3,051,278 | Smythe | Aug. 28, 1962 |

FOREIGN PATENTS

| | | |
|---|---|---|
| 116,651 | Austria | Mar. 10, 1930 |
| 447,471 | Great Britain | May 18, 1936 |